(12) United States Patent
Kitamura

(10) Patent No.: US 10,845,568 B2
(45) Date of Patent: Nov. 24, 2020

(54) LENS-GROUP MOVING APPARATUS AND OPTICAL EQUIPMENT

(71) Applicant: Konica Minolta, Inc., Tokyo (JP)

(72) Inventor: Hiroki Kitamura, Sakai (JP)

(73) Assignee: Koniva Minolta, Inc., Tokyo (JP)

( * ) Notice: Subject to any disclaimer, the term of this patent is extended or adjusted under 35 U.S.C. 154(b) by 147 days.

(21) Appl. No.: 16/256,513

(22) Filed: Jan. 24, 2019

(65) Prior Publication Data

US 2019/0243088 A1   Aug. 8, 2019

(30) Foreign Application Priority Data

Feb. 5, 2018  (JP) ................. 2018-018413

(51) Int. Cl.
  *G02B 7/10*  (2006.01)
  *G02B 7/08*  (2006.01)
  *G03B 3/10*  (2006.01)
  *G02B 7/02*  (2006.01)

(52) U.S. Cl.
  CPC .............. *G02B 7/10* (2013.01); *G02B 7/021* (2013.01); *G02B 7/08* (2013.01); *G03B 3/10* (2013.01)

(58) Field of Classification Search
  CPC ........ G02B 7/102; G02B 7/10; G02B 13/009; G02B 15/14; G03B 3/10
  USPC ....................................... 359/694
  See application file for complete search history.

(56) References Cited

U.S. PATENT DOCUMENTS

| 5,392,159 | A | 2/1995 | Sasaki et al. | |
| 5,748,394 | A | 5/1998 | Shimazaki et al. | |
| 2006/0072214 | A1* | 4/2006 | Kawaguchi | G02B 7/10 |
| | | | | 359/704 |
| 2010/0172032 | A1* | 7/2010 | Fukino | G02B 7/10 |
| | | | | 359/700 |
| 2012/0086821 | A1 | 4/2012 | Yasutomi et al. | |

FOREIGN PATENT DOCUMENTS

JP    H08-005891 A    1/1996

OTHER PUBLICATIONS

Extended European Search Report issued in European Application No. 19155572.1, dated Jun. 14, 2019 (6 pages).

\* cited by examiner

*Primary Examiner* — Mohammed A Hasan
(74) *Attorney, Agent, or Firm* — Osha Bergman Watanabe & Burton LLP

(57) ABSTRACT

A lens-group moving apparatus for moving, in an optical system including a plurality of lenses, a lens group including at least one lens among the plurality of lenses includes: a moving lens frame that holds the lens group; a fixed cylinder that holds the moving lens frame movably in an optical axis direction; a moving frame that is movable in the optical axis direction and changes a relative position with respect to the fixed cylinder; a moving structure that causes the moving frame to move in the optical axis direction; an intermediate member that contacts the moving frame and the moving lens frame and that transmits a movement of the moving frame to the moving lens frame; and an urging member that urges the moving lens frame in a direction of the intermediate member.

9 Claims, 3 Drawing Sheets

LENS-GROUP MOVING APPARATUS AND OPTICAL EQUIPMENT

The entire disclosure of Japanese patent Application No. 2018-018413, filed on Feb. 5, 2018, is incorporated herein by reference in its entirety.

TECHNOLOGICAL FIELD

The present invention relates to a lens-group moving apparatus and optical equipment, and for example, relates to a lens-group moving apparatus for moving a focusing lens group and to optical equipment including the lens-group moving apparatus.

BACKGROUND

While optical equipment (projectors, digital cameras, and the like) is mounted with an apparatus for moving a lens group for focusing and zooming of an optical system, it may functionally be necessary to arrange a driving part and a lens group apart from each other. For example, in a lens-group moving apparatus disclosed in JP 8-5891 A, an influence of vibration and imbalance of weight balance are inhibited by adopting a configuration in which a drive motor is arranged away from a lens group in an optical axis direction to transmit a rotational force of the drive motor to a bar, and the lens group is moved in the optical axis direction as the bar rotates.

However, in the lens-group moving apparatus described in JP 8-5891 A, it is necessary to provide a gear or a helicoid system on an outside of the lens group to be moved, which increases a size of the optical equipment in a radial direction of the lens group. Further, since the number of parts increases, there may be a possibility of causing deterioration of assembling performance and an increase in cost.

SUMMARY

Embodiments of the present invention provide a lens-group moving apparatus having less parts and capable of suppressing an increase in size of optical equipment in a radial direction of the lens group, and to provide optical equipment including the lens-group moving apparatus.

According to one or more embodiments of the present invention, there is provided a lens-group moving apparatus for moving, in an optical system including a plurality of lenses, a lens group including at least one lens among the plurality of lenses, and the lens-group moving apparatus according to one or more embodiments of the present invention comprises: a moving lens frame that holds the lens group; a fixed cylinder that holds the moving lens frame movably in an optical axis direction; a moving frame movable in an optical axis direction to change a relative position with respect to the fixed cylinder; a moving structure that acts to cause the moving frame to move in an optical axis direction; an intermediate member that transmits a movement of the moving frame to the moving lens frame, in a state of being in contact with the moving frame and with the moving lens frame; and an urging member that urges the moving lens frame in a direction of the intermediate member.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
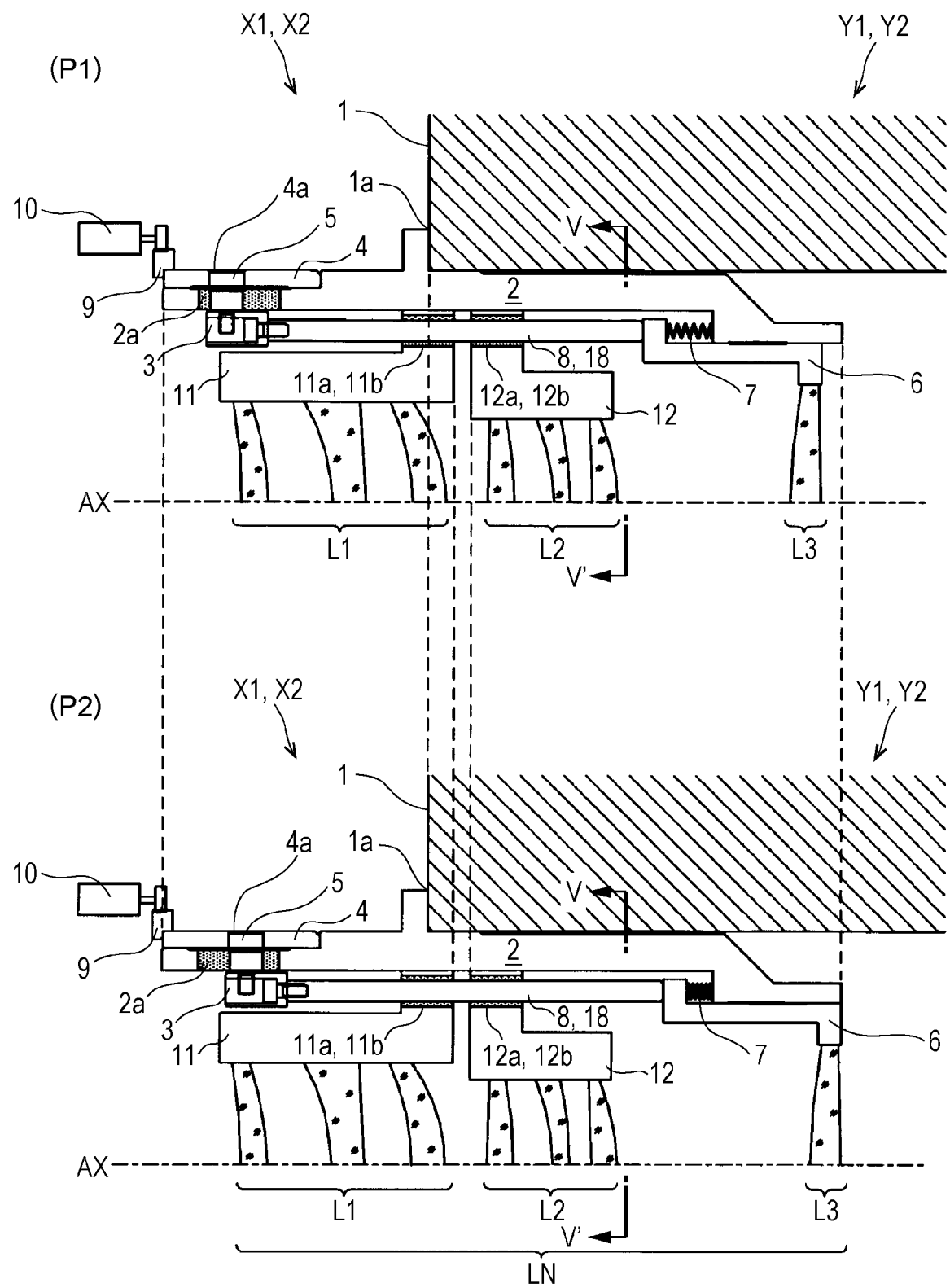
FIG. 1 is a cross-sectional view showing a schematic configuration according to one or more embodiments (a cam type moving structure) with two focus positions.

Hereinafter, one or more embodiments of a lens-group moving apparatus, a projector, and the like embodying the present invention will be described with reference to the drawings. However, the scope of the invention is not limited to the disclosed embodiments. It should be noted that, in the individual embodiments and the like, the same reference numerals are given to mutually the same or corresponding parts, and redundant explanation will be appropriately omitted.

Figure 2:
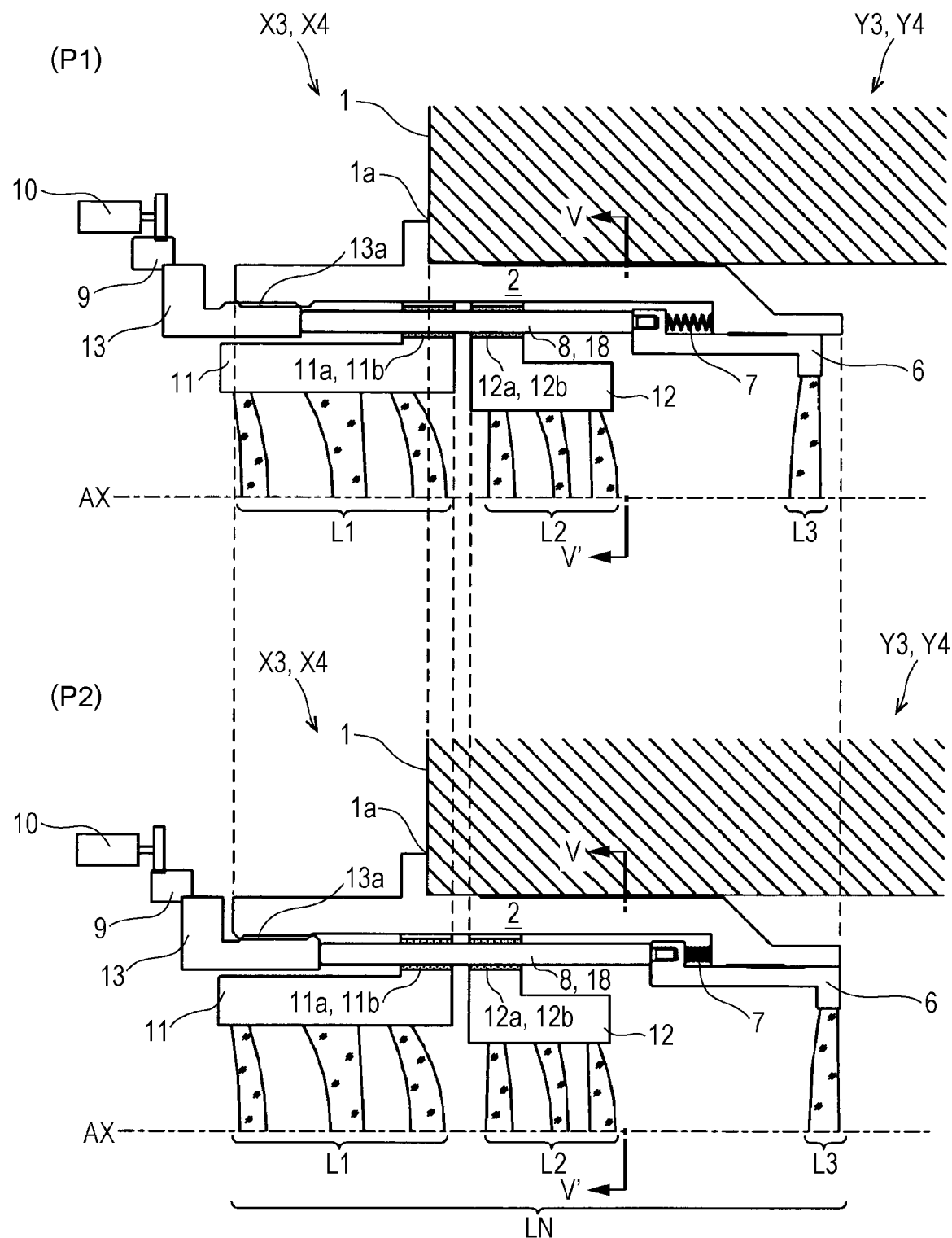
FIG. 2 is a cross-sectional view showing a schematic configuration according to one or more embodiments (a helicoid type moving structure) with two focus positions.

FIG. 1 shows a schematic cross-sectional structure of lens-group moving apparatuses X1 and X2 and projectors Y1 and Y2 according to one or more embodiments, and FIG. 2 shows a schematic cross-sectional structure of lens-group moving apparatuses X3 and X4 and projectors Y3 and Y4 according to one or more embodiments. Since FIGS. 1 and 2 exclusively show a cross section on one side from an optical axis AX, the schematic cross-sectional structure shown in FIG. 1 is substantially the same between like embodiments, and the schematic cross-sectional structure shown in FIG. 2 is substantially the same between like embodiments. The projectors Y1 to Y4 are an example of optical equipment including: a projection optical system LN formed of a plurality of lenses; lens-group moving apparatuses X1 to X4; a projector main body 1; and an image display element (not shown). The projectors Y1 to Y4 enlarge and project an image displayed on an image display surface of the image display element, on a screen surface by the projection optical system LN.

The projection optical system LN is formed of first, second, and third lens groups L1, L2, and L3. The first lens group L1 is held by a first lens frame n, the second lens group L2 is held by a second lens frame 12, and the third lens group L3 is held by a moving lens frame (third lens frame) 6. The third lens group L3 including a lens on the most reduction side is a focus correcting lens. Focusing is performed by moving the moving lens frame 6 holding the third lens group L3, with the lens-group moving apparatuses X1 to X4. In FIGS. 1 and 2, (P1) indicates a focus position when the moving lens frame 6 performs focus movement toward an enlargement side (the left side in the drawing), and (P2) indicates a focus position when the moving lens frame 6 performs focus movement toward a reduction side (the right side in the figure).

In addition to the moving lens frame 6, the lens-group moving apparatuses X1 to X4 have: a fixed cylinder 2 to hold the moving lens frame 6 movably in the optical axis AX direction; and a moving frame 3 or a moving frame 13 movable in the optical axis AX direction such that a relative position with respect to the fixed cylinder 2 changes. The moving lens frame 6 is held by engagement with the fixed cylinder 2. Further, the projectors Y1 to Y4 are provided with: a motor 10 as a driving source to move the lens group; and a gear 9 to input the driving force to the lens-group moving apparatuses X1 to X4.

In the lens-group moving apparatuses X1 and X2 (FIG. 1), a rectilinear groove 2*a* is provided to the fixed cylinder 2, and there are further provided a cam cylinder 4 rotatable with respect to the fixed cylinder 2 and provided with a cam groove 4*a*, and a cam follower 5 attached to the moving frame 3 in an engaged state with the rectilinear groove 2*a* and the cam groove 4*a*. Then, there is provided a moving structure that acts such that the moving frame 3 moves in the optical axis AX direction, and the moving structure is formed by the engagement of the cam follower 5 with the rectilinear groove 2*a* and with the cam groove 4*a*. That is, a cam system is formed by the cam cylinder 4 fitted to the outside of the fixed cylinder 2, and the moving frame 3 brought into a state of being engaged with the rectilinear groove 2*a* and the cam groove 4*a* via the cam follower 5. When the cam cylinder 4 is rotated with respect to the fixed cylinder 2, a position of the moving frame 3 in the optical axis AX direction changes. Here, the cam cylinder 4 is rotated by motor drive using the motor 10 and the gear 9, but the cam cylinder 4 may be rotated manually.

The lens-group moving apparatuses X3 and X4 (FIG. 2) is provided with a moving structure that acts such that the moving frame 13 moves in the optical axis AX direction, and the moving structure is formed by a helicoid 13*a* provided to the fixed cylinder 2 and to the moving frame 13. That is, the moving structure is formed by a helicoid system. When the moving frame 13 is rotated with respect to the fixed cylinder 2, a position of the moving frame 13 in the optical axis AX direction changes. Here, the cam cylinder 4 is rotated by motor drive using the motor 10 and the gear 9, but the cam cylinder 4 may be rotated manually.

Figure 3:
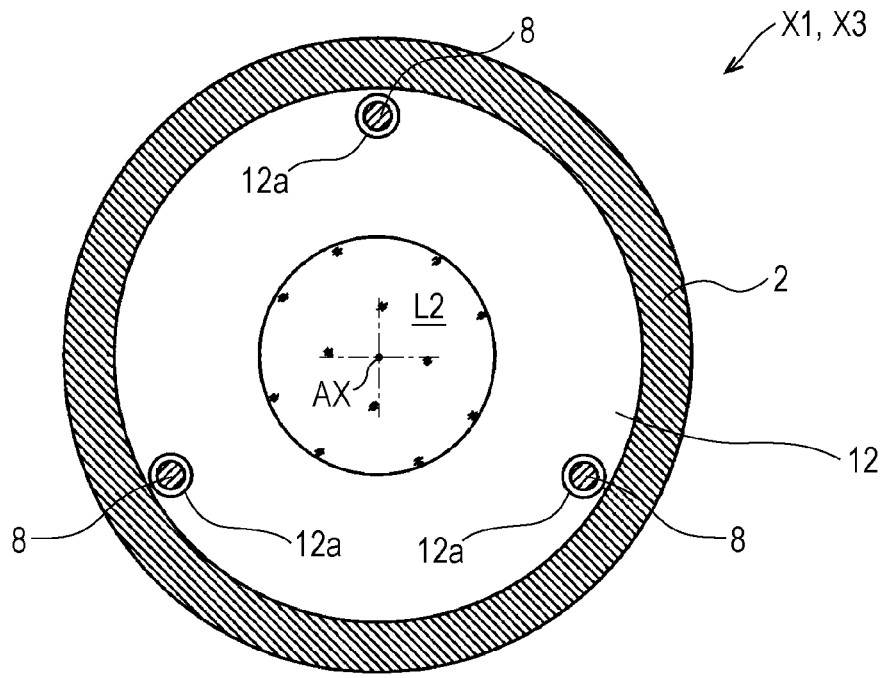
FIG. 3 is a cross-sectional view taken along line V-V' of FIGS. 1 and 2 according to one or more embodiments (a shaft-shaped intermediate member)
Figure 4:
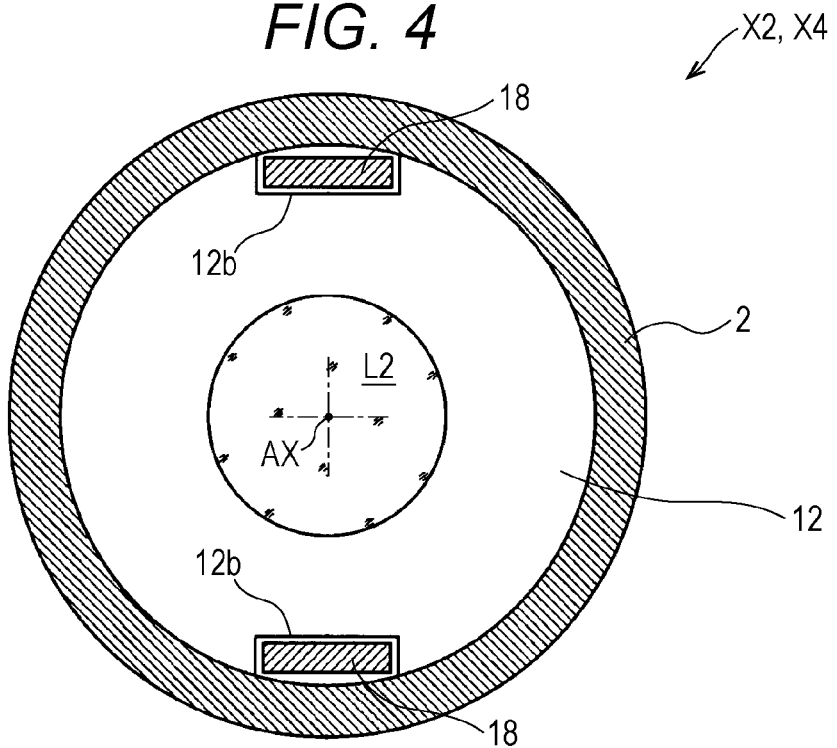
FIG. 4 is a cross-sectional view taken along line V-V' of FIGS. 1 and 2 according to one or more embodiments (a flat-plate-shaped intermediate member).

The lens-group moving apparatuses X1 and X3 (FIGS. 1 and 2) have: a shaft-shaped intermediate member 8 to transmit a movement of the moving frames 3 and 13 to the moving lens frame 6 in a state of being in contact with the moving frames 3 and 13 and with the moving lens frame 6; and an urging member 7 to urge the moving lens frame 6 toward the intermediate member 8. FIG. 3 shows a cross-sectional structure taken along line V-V' in FIGS. 1 and 2 in the lens-group moving apparatuses X1 and X3. Further, the lens-group moving apparatuses X2 and X4 (FIGS. 1 and 2) have: a flat-plate-shaped intermediate member 18 to transmit a movement of the moving frames 3 and 13 to the moving lens frame 6 in a state of being in contact with the moving frames 3 and 13 and with the moving lens frame 6; and an urging member 7 to urge the moving lens frame 6 toward the intermediate member 18. FIG. 4 shows a cross-sectional structure taken along line V-V' in FIGS. 1 and 2 in the lens-group moving apparatuses X2 and X4. In the lens-group moving apparatuses X1 to X4, it is assumed that a compression spring is used as the urging member 7, but other kinds of elastic members such as a spring and rubber may be used.

In the lens-group moving apparatus X1 having the cam type moving structure and the shaft-shaped intermediate member 8 (FIG. 1), in the three intermediate members 8 (FIG. 3), one end is fastened to the moving frame 3, and the other end is in non-fixed contact with the moving lens frame 6. The moving lens frame 6 is fitted to and held by the fixed cylinder 2 movably in the optical axis AX direction, but may be fitted to and held by a part (fastener) fastened to the fixed cylinder 2 movably in the optical axis AX direction. Further, the intermediate member 8 is not required to be a part separate from the moving frame 3 or the moving lens frame 6, but may be integrated with at least one of the moving frame 3 or the moving lens frame 6. The number of the intermediate members 8 is not limited, but when the number of the intermediate members 8 is two or less, it is required to pay attention to a sectional shape of the intermediate member 8, in order to suppress an inclination of the moving lens frame 6 due to disturbance or the like.

In the lens-group moving apparatus X1 (FIG. 1), while the first lens frame 11 and the second lens frame 12 are positioned between the moving frame 3 and the moving lens frame 6, the first lens frame 11 is provided with a hole 11*a* passing through in the optical axis AX direction, and the second lens frame 12 is provided with a hole 12*a* passing through in the optical axis AX direction. Since the intermediate member 8 is arranged so as to pass through these holes 11*a* and 12*a*, the intermediate member 8 does not come into contact with the first and second lens frames 11 and 12, and it is also possible to avoid an increase in size in the radial direction of the lens. Then, by the urging member 7 arranged between the moving lens frame 6 and the fixed cylinder 2 (which may be a part fastened to the fixed cylinder 2), the moving lens frame 6 is constantly pressed against the intermediate member 8. Since the moving lens frame 6 holds the third lens group L3 functioning as a focus correcting lens, the intermediate member 8 and the moving lens frame 6 are moved in the optical axis AX direction by the cam system while a contact pressure state between the intermediate member 8 and the moving lens frame 6 is maintained when the cam cylinder 4 is rotated with respect to the fixed cylinder 2 by motor drive (or manual operation). Adjustment of a position of the focus correcting lens (the third lens group L3) by a movement of the moving lens frame 6 enables focus adjustment of the projection optical system LN.

In the lens-group moving apparatus X2 having the cam type moving structure and the flat-plate-shaped intermediate member 18 (FIG. 1), in the two intermediate members 18 (FIG. 4), one end is fastened to the moving frame 3, and the other end is in non-fixed contact with the moving lens frame 6. The moving lens frame 6 is fitted to and held by the fixed cylinder 2 movably in the optical axis AX direction, but may be fitted to and held by a part fastened to the fixed cylinder 2 movably in the optical axis AX direction. Further, the intermediate member 18 is not required to be a part separate from the moving frame 3 or the moving lens frame 6, but may be integrated with at least one of the moving frame 3 or the moving lens frame 6. The number of the intermediate members 18 is not limited, but when the number of the intermediate members 18 is two or less, it is required to pay attention to a sectional shape of the intermediate member 18, in order to suppress an inclination of the moving lens frame 6 due to disturbance or the like. In the lens-group moving apparatus X2, the intermediate member 18 having a long cross-sectional shape in a lateral direction is used in order to suppress a rotational inclination about a vertical center line in FIG. 4 as an axis.

In the lens-group moving apparatus X2 (FIG. 1), while the first lens frame 11 and the second lens frame 12 are positioned between the moving frame 3 and the moving lens frame 6, the first lens frame 11 is provided with a hole 11*b* passing through in the optical axis AX direction, and the second lens frame 12 is provided with a hole 12*b* passing through in the optical axis AX direction. Since the intermediate member 18 is arranged so as to pass through these holes 11*b* and 12*b*, the intermediate member 18 does not come into contact with the first and second lens frames 11 and 12, and it is also possible to avoid an increase in size in the radial direction of the lens. Then, by the urging member 7 arranged between the moving lens frame 6 and the fixed cylinder 2 (which may be a part fastened to the fixed cylinder 2), the moving lens frame 6 is constantly pressed against the intermediate member 8. Since the moving lens frame 6 holds the third lens group L3 functioning as a focus correcting lens, the intermediate member 18 and the moving lens frame 6 are moved in the optical axis AX direction by the cam system while a contact pressure state between the intermediate member 18 and the moving lens frame 6 is maintained when the cam cylinder 4 is rotated with respect to the fixed cylinder 2 by motor drive (or manual operation). Adjustment of a position of the focus correcting lens (the third lens group L3) by a movement of the moving lens frame 6 enables focus adjustment of the projection optical system LN.

In the lens-group moving apparatus X3 having the helicoid type moving structure and the shaft-shaped intermediate member 8 (FIG. 2), in the three intermediate members 8 (FIG. 3), one end is fastened to the moving lens frame 6, and the other end is in non-fixed contact with the moving frame 13. The moving lens frame 6 is fitted to and held by the fixed cylinder 2 movably in the optical axis AX direction, but may be fitted to and held by a part fastened to the fixed cylinder 2 movably in the optical axis AX direction. Further, the intermediate member 8 is not required to be a part separate from the moving frame 13 or the moving lens frame 6, but may be integrated with at least one of the moving frame 13 or the moving lens frame 6. However, since the moving frame 13 is rotated by motor drive, it is desirable to avoid fixing or integrating the intermediate member 8 and the moving frame 13. The number of the intermediate members 8 is not limited, but when the number of the intermediate members 8 is two or less, it is required to pay attention to a sectional shape of the intermediate member 8, in order to suppress an inclination of the moving lens frame 6 due to disturbance or the like.

In the lens-group moving apparatus X3 (FIG. 2), while the first lens frame 11 and the second lens frame 12 are positioned between the moving frame 13 and the moving lens frame 6, the first lens frame 11 is provided with a hole 11a passing through in the optical axis AX direction, and the second lens frame 12 is provided with a hole 12a passing through in the optical axis AX direction. Since the intermediate member 8 is arranged so as to pass through these holes 11a and 12a, the intermediate member 8 does not come into contact with the first and second lens frames 11 and 12, and it is also possible to avoid an increase in size in the radial direction of the lens. Then, by the urging member 7 arranged between the moving lens frame 6 and the fixed cylinder 2 (which may be a part fastened to the fixed cylinder 2), the moving lens frame 6 and the intermediate member 8 are constantly pressed against the moving frame 13. Since the moving lens frame 6 holds the third lens group L3 functioning as a focus correcting lens, the intermediate member 8 and the moving lens frame 6 are moved in the optical axis AX direction by the helicoid system while a contact pressure state between the intermediate member 8 and the moving frame 13 is maintained when the moving frame 13 is rotated with respect to the fixed cylinder 2 by motor drive (or manual operation). Adjustment of a position of the focus correcting lens (the third lens group L3) by a movement of the moving lens frame 6 enables focus adjustment of the projection optical system LN.

In the lens-group moving apparatus X4 having the helicoid type moving structure and the flat-plate-shaped intermediate member 18 (FIG. 2), in the two intermediate members 18 (FIG. 4), one end is fastened to the moving lens frame 6, and the other end is in non-fixed contact with the moving frame 13. The moving lens frame 6 is fitted to and held by the fixed cylinder 2 movably in the optical axis AX direction, but may be fitted to and held by a part fastened to the fixed cylinder 2 movably in the optical axis AX direction. Further, the intermediate member 18 is not required to be a part separate from the moving frame 13 or the moving lens frame 6, but may be integrated with at least one of the moving frame 13 or the moving lens frame 6. However, since the moving frame 13 is rotated by motor drive, it is desirable to avoid fixing or integrating the intermediate member 18 and the moving frame 13. The number of the intermediate members 18 is not limited, but when the number of the intermediate members 18 is two or less, it is required to pay attention to a sectional shape of the intermediate member 18, in order to suppress an inclination of the moving lens frame 6 due to disturbance or the like. In the lens-group moving apparatus X4, an intermediate member 18 having a long cross-sectional shape in a lateral direction is used in order to suppress a rotational inclination about a vertical center line in FIG. 4 as an axis.

In the lens-group moving apparatus X4, while the first lens frame 11 and the second lens frame 12 are positioned between the moving frame 13 and the moving lens frame 6, the first lens frame 11 is provided with a hole 11b passing through in the optical axis AX direction, and the second lens frame 12 is provided with a hole 12b passing through in the optical axis AX direction. Since the intermediate member 18 is arranged so as to pass through these holes 11b and 12b, the intermediate member 18 does not come into contact with the first and second lens frames 11 and 12, and it is also possible to avoid an increase in size in the radial direction of the lens. Then, by the urging member 7 arranged between the moving lens frame 6 and the fixed cylinder 2 (which may be a part fastened to the fixed cylinder 2), the moving lens frame 6 and the intermediate member 18 are constantly pressed against the moving frame 13. Since the moving lens frame 6 holds the third lens group L3 functioning as a focus correcting lens, when the moving frame 13 is rotated with respect to the fixed cylinder 2 by motor drive (or manual operation) the intermediate member 8 and the moving lens frame 6 are moved in the optical axis AX direction by the helicoid system while a contact pressure state between the intermediate member 18 and the moving frame 13 is maintained. Adjustment of a position of the focus correcting lens (the third lens group L3) by a movement of the moving lens frame 6 enables focus adjustment of the projection optical system LN.

According to the lens-group moving apparatuses X1 to X4 described above, since a movement of the moving frames 3 and 13 is transmitted to the moving lens frame 6 by the intermediate members 8 and 18 to move the third lens group L3, the number of parts is small, and an increase in size of the projectors Y1 to Y4 can be suppressed in the radial direction of the third lens group L3. Even if the third lens group L3 is positioned away from the moving structure such as the cam system, the helicoid system, or the like, it is possible to inhibit an increase in size of the projectors Y1 to Y4 in the radial direction of the third lens group L3 since it is not necessary to provide a gear or a helicoid system outside the third lens group L3 and the moving lens frame 6.

The lens-group moving apparatuses X1 to X4 (FIGS. 1 and 2) is provided with the gear 9 as an input part (input driver) for a driving force to the moving structure such as the cam system and the helicoid system, and there is provided an optical system mounting part (lens mount) 1a to mount the projection optical system LN to the projector main body 1 between the gear 9 and the moving lens frame 6 in the optical axis AX direction. That is, in the lens-group moving apparatuses X1 to X4, since the moving structure can be arranged inside the optical system mounting part 1a, it is even possible to move the moving lens frame 6 arranged at a location with a limited space in the projector main body 1. This is not limited to a projector, but is also applicable to optical equipment such as a digital camera. In addition, since the number of parts is small, improvement of assembling performance and reduction of the cost are also possible.

Although the disclosure has been described with respect to a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A lens-group moving apparatus for moving, in an optical system including a plurality of lenses, a lens group including at least one lens among the plurality of lenses, the lens-group moving apparatus comprising:
   a moving lens frame that holds the lens group;
   a fixed cylinder that holds the moving lens frame movably in an optical axis direction;
   a moving frame that is movable in the optical axis direction and changes a relative position with respect to the fixed cylinder;
   a moving structure that causes the moving frame to move in the optical axis direction;
   an intermediate member that contacts the moving frame and the moving lens frame and that transmits a movement of the moving frame to the moving lens frame; and
   an urging member that urges the moving lens frame in a direction of the intermediate member.

2. The lens-group moving apparatus according to claim 1, further comprising:
   a rectilinear groove disposed on the fixed cylinder;
   a cam cylinder that is rotatable with respect to the fixed cylinder and comprises a cam groove; and
   a cam follower that is mounted to the moving frame and that engages the rectilinear groove and the cam groove, wherein
   the moving structure comprises the engagement of the cam follower with the rectilinear groove and with the cam groove.

3. The lens-group moving apparatus according to claim 1, wherein the moving structure comprises a helicoid disposed on the fixed cylinder and on the moving frame.

4. The lens-group moving apparatus according to claim 1, wherein
   a lens frame disposed between the moving frame and the moving lens frame has a hole disposed in the optical axis direction, and
   the intermediate member passes through the hole.

5. The lens-group moving apparatus according to claim 1, wherein the moving lens frame is held by fitting the moving lens frame to the fixed cylinder or by fastening the moving lens frame to the fixed cylinder with a fastener.

6. The lens-group moving apparatus according to claim 1, wherein
   a lens group held by the moving lens frame is a focus correcting lens, and
   a movement of the moving lens frame enables focus adjustment of the optical system.

7. The lens-group moving apparatus according to claim 1, further comprising
   an input driver that provides a driving force to the moving structure, wherein
   a lens mount that attaches the optical system is disposed between the input driver and the moving lens frame in the optical axis direction.

8. The lens-group moving apparatus according to claim 1, wherein the intermediate member is integrated with the moving frame or with the moving lens frame.

9. An optical equipment comprising:
   the optical system; and
   the lens-group moving apparatus according to claim 1.

* * * * *